United States Patent Office 2,699,662
Patented Jan. 18, 1955

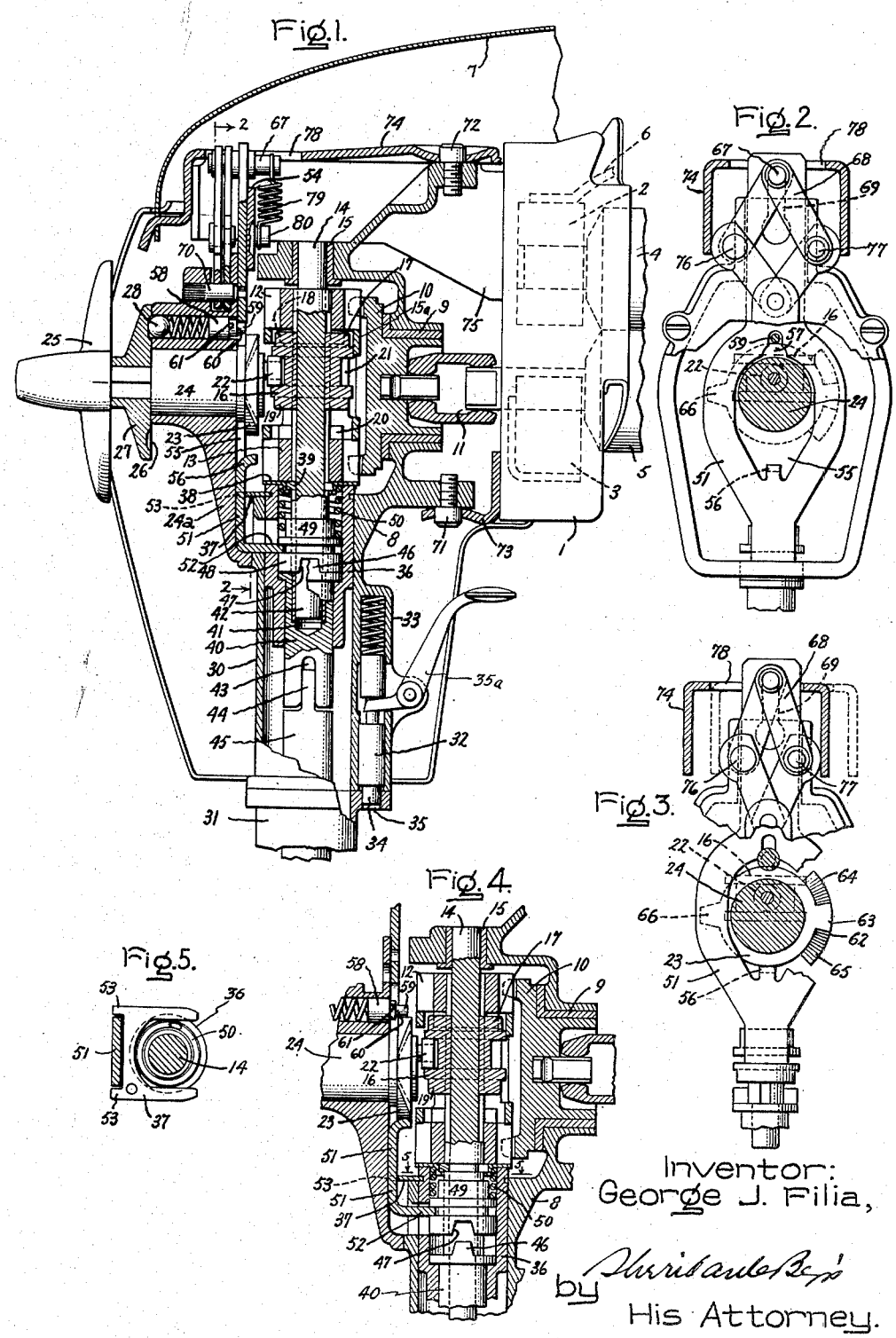

2,699,662

CLOTHES WRINGER RELEASE MECHANISM

George J. Filia, Bridgeport, Conn., assignor to General Electric Company, a corporation of New York Application August 13, 1952, Serial No. 304,107

8 Claims. (Cl. 68—249)

The present invention relates primarily to clothes wringers of the type wherein the wringer frame is pivoted on the wringer head and is held from swinging relatively to the head by spring means, an emergency release means being operated when the frame swings in either direction with respect to the head against the action of the spring means.

The object of the present invention is to provide an improved construction and arrangement of emergency release mechanism in a wringer of this type, and for a consideration of what I believe to be novel and my invention, attention is directed to the following specification and to the claims appended thereto.

According to my invention, I provide a clutch in the wringer drive between the main drive shaft and the wringer gearing and novel means for opening the clutch and locking it open when the wringer frame swings in either direction relatively to the wringer head; and in connection therewith I provide preferably novel means which prevents release of the clocking means and the closing of the clutch except when the wringer gearing is in neutral position.

In the drawing Fig. 1 is a sectional view of a part of a clothes wringer embodying my invention, the safety release clutch being shown in closed position and the wringer gearing in mesh to drive the wringer rolls in one direction; Fig. 2 is a detail view taken on irregular section line 2—2, Fig. 1, but with parts omitted better to illustrate other parts; Fig. 3 is a view similar to Fig. 2 showing the parts in clutch release position, Fig. 4 is a detail view similar to Fig. 1 showing the parts in clutch release position, and Fig. 5 is a detail sectional view taken on line 5—5, Fig. 4.

Referring to the drawing, 1 indicates an end of the wringer frame in which are bearing blocks 2 and 3 in which are positioned the shaft ends of upper and lower wringer rolls 4 and 5. At 6 is a bar which at its ends engages the bearing blocks to apply pressure on them and at 7 is a cover plate. Only the left-hand end of the wringer frame and the rolls is illustrated, as wringer structures of this type are well known and the portion illustrated is sufficient for an understanding of the invention. The wringer head is indicated at 8. It is shaped to provide a bearing 9 for a crown gear 10 which is connected to drive lower roll 5 by a suitable coupling 11. Meshing with crown gear 10 are upper and lower spaced driving or reversing gears 12 and 13 rotatably mounted to turn on a gear shaft 14 which is supported at its upper end in a bearing 15. Gears 12 and 13 are held in spaced relation by a suitable spacing frame 15a. Splined on shaft 14 so as to slide along it is a gear clutch spool 16 having teeth 17 on its upper end adapted to engage clutch teeth 18 on gear 12 when the spool is moved upward and clutch teeth 19 on its lower end adapted to engage clutch teeth 20 on gear 13 when the spool is moved downward. At its central portion clutch spool 16 is provided with an annular groove 21 in which is located a pin 22 eccentrically mounted on a disk 23 carried by a barrel 24 pivoted in an opening in the wringer head cover plate 24a which is attached to head 8. Disc 23 forms in substance a flange on the inner end of barrel 24. On the outer end of barrel 24 is an operating knob 25. By turning knob 25 the barrel 24 and pin 22 are turned to shift clutch spool 16 from a neutral position where it engages neither gear 12 or 13 to an operating position where it engages one or the other. Its position is indexed by three space depressions 26 in a flange 27 which turns with the barrel, the depressions receiving a spring pressed ball 28. In Figs. 1 and 4, knob 25 is shown as having been turned clockwise when viewed from the left from neutral position to a position where clutch spool 16 engages gear 12. This is a known type of clothes wringer reversing gear drive, the operation of which is well understood by those familiar with clothes wringer design.

Depending from head 8 is a tubular wringer supporting post 30 provided with a flange at its lower end which rests on the upper end of a post 31 which forms a part of the clothes washing machine upon which the wringer is mounted. Post 31 forms a support for the wringer on which it may pivot as a unit in a horizontal plane. Its position is indexed by a spring pressed pin 32 carried in a boss 33 on the side of post 30 and provided with an end 34 adapted to fit into indexing openings 35 at the upper end of post 31. At 35a is a pivoted lever for operating pin 32. This arrangement permits of the wringer being adjusted in a horizontal plane with respect to the clothes washing machine on which it is mounted.

In the upper end of post 30 is a drive shaft bearing sleeve 36 supported on the top of post 30 by a U-shaped retaining washer 37, the arms of which slide around opposite sides of sleeve 36 in a groove in the sleeve. The top of bearing sleeve 36 forms a bearing support for gear 13, the gear being supported on a thrust washer 38 which rests on top of sleeve 36. Thrust washer 38 is held against vertical movement with respect to shaft 14 by a snap ring 39 positioned in an annular groove in shaft 14. In bearing sleeve 36 spaced from its upper end is a shoulder on which rests a flange on the upper end of a coupling 40. The upper end of coupling 40 is provided with a socket 41 having a bearing lining in which the lower end 42 of shaft 14 is journalled. The lower end of coupling 40 has a transverse slot 43 in which fits a tongue 44 on the upper end of main wringer drive shaft 45 which may be driven from the washing machine motor. Coupling 40 has a flat top surface on which are a plurality of upwardly projecting clutch teeth 46 adapted to engage in recesses 47 in a flange 48 on the lower end of a drive clutch 49. Drive clutch 49 is splined on shaft 14 and is adapted to be moved vertically on the shaft to bring it out of and into engagement with clutch teeth 46. When the clutch is engaged as shown in Fig. 1, drive shaft 45 turns coupling 40 which through clutch 49 turns gear shaft 14 for driving the wringer rolls. When the clutch is disengaged as shown in Fig. 4, coupling 40 turns idly on the lower end 42 of shaft 14. Clutch 49 is biased to closed position by a spring 50 positioned between flange 48 and the under side of thrust washer 38.

For moving clutch 49 to open position, there is provided a sliding shift plate 51 which slides along the inner surface of cover plate 24a and has an inturned finger 52 at its lower end which engages in an annular groove in clutch flange 48, the finger projecting through openings in post 30 and sleeve 36. At its lower end plate 51 is guided by spaced ears (not shown) on the inside of cover plate 24a between which the plate slides and it is held between the spaced ears by retaining washer 37 which is spaced from the inner surface of cover plate 24a by ears 53 on U-shaped retaining washer 37 as shown in Fig. 5. At its upper end it is guided by a wall 54 which forms a part of wringer head cover 24a. It is positioned between the inner surface of cover plate 24a and disk 23. Plate 51 has an oblong-shaped central opening 55 through which the inner end of barrel 24 extends, the arrangement being such that the plate may move vertically relatively to the barrel. At the lower end of opening 55 is an inwardly projecting stop tongue 56 and at its upper end is an upwardly extending locking slot 57 shaped as shown clearly in Fig. 2 to provide an upper end of smaller width and a wider lower end. Cooperating with locking slot 57 is a spring pressed locking pin 58 carried by cover plate 24a having an end 59 which projects inwardly through slot 57 to a position over the periphery of disc 23 and a shoulder 60 which normally engages the outer surface of plate 51 in line of the upper, smaller end of slot 57. When plate 51 is moved upwardly to open clutch 49, locking pin 58 is projected through the wider lower end of slot 57 to lock the clutch in open position, inward movement being limited by a second shoulder 61 on the locking pin which then engages the outer surface of plate 51. This position of locking pin 58 is shown in Figs. 3 and 4.

For moving locking pin 58 from locking to non-locking position, disc 23 is provided on one side with an outwardly projecting wing 62 having a flat central surface 63 and two sloping cam surfaces 64 and 65. Wing 62 is so located that when barrel 24 is turned by knob 25, one or the other of the cam surfaces 64—65 (depending on the direction in which the knob is turned) will engage the end of pin 58 and force it outwardly to non-locking position, thus releasing plate 51. At the end of this movement, the end of pin 58 will be resting on flat surface 63. This corresponds to neutral position of knob 25 and the wringer gears. When the wringer gears are in neutral position, a projection 66 on disc 23 opposite flat surface 63 stands in line with stop tongue 56 to lock plate 51 against vertical upward movement. Thus it will be seen that when clutch 49 is closed and the wringer gearing is in neutral position, the clutch is locked in closed position by projection 66 and locking pin 58 is held in non-locking position.

The upper end of plate 51 is connected to the top pivot pin 67 of a pantograph comprising four pivotally connected arms 68, the pin projecting through an elongated slot 69 in plate 51 as best shown in Figs. 2 and 3. The lower pivot pin 70 of the pantograph is fixed in cover plate 24a. Thus the upper end of plate 51 is connected to the wringer head by the pantograph.

The wringer frame is pivoted on the wringer head by a lower pivot pin 71 and an upper pivot pin 72. Pivot pin 71 is positioned in an opening in a bracket 73 fixed to frame 1. Pivot pin 72 is positioned in an opening in an actuating arm 74 attached to frame 1 by two spaced side wings 75, only one of which shows in the drawing. Arm 74 is U-shaped in transverse cross-section and extends to a position where it encompasses the pantograph, its side walls engaging with the pantograph at its two side elbows or pivot point 76 and 77. The top wall of arm 74 is provided with an opening 78 in line with plate 51 and through which the upper end of the plate may project. The pantograph is biased to a position where its side elbows 76 and 77 are in engagement with the side walls of arm 74 by a spring 79 which at its upper end is connected to pin 67 and its lower end to a pin 80 on stationary wall 54.

The operation is as follows:

With the wringer part to normal position and knob 25 in neutral position, clutch spool 16 is centered out of position with gears 13 and 14. Spring 79 holds the side elbows 76 and 77 of the pantograph in engagement with the side walls of arms 74 thus holding the wringer frame yieldingly in straight alignment with wringer head 8. Clutch 49 is held closed by spring 50 which also holds lever 51 in its down position in which position it holds locking pin 58 in non-locking position. Flat surface 63 on wing 62 will be in line with the end of pin 58 and projection 66 on disc 23 will stand over stop tongue 56 on lever 51. As a result the clutch will be held down in positively engaged position by lever 51 and the lever in turn will be held by disc 23. Thus if any effort is made to turn the wringer frame on its pivot 71 and 72 in either direction relatively to head 8 against the action of spring 79 at a time when the wringer gears are in neutral position, nothing can happen since lever 51 is held from moving upward by disc 23. At this time, the washing machine motor may be turning shaft 45, coupling 40, clutch 49, gear shaft 14, and clutch spool 16, but the wringer rolls will not be driven since clutch spool 16 is in neutral position. The wringer rolls may be operated in either direction by turning knob 25 to bring clutch spool 16 in engagement with one or other of the gears 13 and 14.

In Fig. 1 clutch spool 16 is shown as having been moved up into engagement with gear 12 to effect driving of the wringer rolls in one direction. When knob 25 is thus turned from neutral position, disc 23 is turned to the position shown in Figs. 2 and 3 wherein flat surface 63 is moved away from in front of locking pin 58 and projection 66 is moved away from its position over stop tongue 56. Now lever 51 is held down only by spring 50. If now wringer frame 1 is turned on its pivots 71—72 with respect to head 8, arm 74 will engage one or the other of the elbows of the pantograph thus collapsing it and raising lever 51 as shown in Fig. 3 to open clutch 49 and thus disrupt the drive to the wringer rolls since gear shaft 14 will be disconnected from coupling 40.

The wringer may be used in a normal manner to wring clothes as long as the wringer frame is not turned relatively to head 8. If while in use, there is an unusual pull or push applied to the wringer frame, either by the operator due to some emergency or by a drag effected by clothes or other thing being pulled in between the wringer rolls, the wringer frame will turn on its pivots against the action of spring 79 to raise lever 51 and open clutch 49. When this occurs, locking pin 58 is forced out into slot 57 to lock lever 51 in its raised position and thus lock clutch 49 in open position. The position of the several parts under these conditions is shown in Fig. 3. In Fig. 3, arm 74 is shown as having collapsed the pantograph and as being still in engagement with it. When the pull or push on the wringer frame is removed, spring 79 will return the wringer frame and pantograph to normal position, pin 67 moving down in slot 69 away from the top of the slot. However, lever 51 will be held in clutch releasing position by the locking pin.

To restore the wringers to normal condition after an emergency operation as just described, it is necessary to turn knob 25 to bring clutch spool 16 to neutral position. This would require a turning movement of knob 25 in a counterclockwise direction as viewed in Figs. 2 and 3. When thus turned, cam surface 64 will engage the end of locking pin 58 forcing it back with respect to notch 57 whereupon clutch spring 50 will move lever 51 down and close clutch 49. The wringer gears will be now in neutral position and the wringer may be again used in normal manner.

If at the time frame 1 was turned on its pivot, clutch spool 16 had been in engagement with gears 13 the operation for restoring the parts to normal position would be the same except that knob 25 would be turned in the other direction to bring it to neutral position since it would have been turned counterclockwise initially to bring the clutch into engagement with gear 13 and cam face 62 would have engaged locking pin 58.

By my invention I provide a wringer release mechanism which is simple in structure, reliable in operation and capable of being manufactured at low cost. It is positive in operation and safe to use since following any emergency operation, the driving clutch is locked in open position and the drive gearing for the wringer rolls must be restored to neutral position before the wringer can be again put into operation.

What I claim as new and desire to secure by Letters Patent of the United States is:

1. In a clothes wringer, a wringer head, a frame, means pivotally connecting the frame to the head, wringer rolls journaled in the frame, gearing including a gear shaft and a clutch member in the head to which said rolls are connected, an operating member for moving said clutch member from a neutral open position to a closed position, a drive shaft, a drive clutch for connecting the drive shaft to the gear shaft, a shift member connected to the drive clutch for moving it, means biasing said shift member in a direction to engage said drive clutch, a linkage connected to said shift member and by which said shift member may be moved to open said drive clutch, means carried by the frame which when the frame is turned relatively to the head moves said linkage to effect movement of the shift member to open said drive clutch, latch means carried by the head which upon movement of said shift member to open the drive clutch engages said shift member to lock said drive clutch in open position, and means actuated by movement of said operating member to neutral position for moving said latch means to release said shift member and permit said drive clutch to be closed.

2. In a clothes wringer, a wringer head, a frame, means pivotally connecting the frame to the head, wringer rolls journaled in the frame, gearing including a gear shaft and a clutch member in the head to which said rolls are connected, an operating member for moving said clutch member from a neutral open position to a closed position, a drive shaft, a drive clutch for connecting the drive shaft to the gear shaft, a shift member connected to the drive clutch for moving it, means biasing said shift member in a direction to engage said drive clutch, a linkage connected to said shift member and by which said shift member may be moved to open said drive clutch, means carried by the frame which when the frame is turned relatively to the head moves said linkage to effect movement of the shift member to open said drive clutch, latch means carried by the head which upon movement of said shift member to open the drive clutch engages said shift member to lock said drive clutch in open position, means actuated by movement of said operating member to neutral position for moving said latch means to release said shift member and permit said drive clutch to be closed, and means carried by said operating member which when the operating member is in neutral position engages said shift member to hold it against clutch opening movement.

3. In a clothes wringer, a wringer head, a frame, means pivotally connecting the frame to the head, wringer rolls journaled in the frame, gearing including a gear shaft and a clutch member in the head to which said rolls are connected, an operating member for moving said clutch member from a neutral open position to a closed position, a disc which turns with said operating member, a drive shaft, a drive clutch for connecting the drive shaft to the gear shaft, a shift member connected to the drive clutch for moving it, means biasing said shift member in a direction to engage said drive clutch, a linkage connected to said shift member and by which said shift member may be moved to open said drive clutch, means carried by the frame which when the frame is turned relatively to the head moves said linkage to effect movement of the shift member to open said drive clutch, latch means which upon movement of said shift member to open the drive clutch engages the shift member to lock said drive clutch in open position, and cam means carried by said disc which upon turning of said operating member to neutral position engages said latch means to move it to release said shift member and effect the closing of said drive clutch.

4. In a clothes wringer, a wringer head, a frame, means pivotally connecting the frame to the head, wringer rolls journaled in the frame, gearing including a gear shaft and a clutch member in the head to which said rolls are connected, an operating member for moving said clutch member from a neutral open position to a closed position, a disc which turns with said operating member, a drive shaft, a drive clutch for connecting the drive shaft to the gear shaft, means biasing said drive clutch to closed position, a shift member connected to the drive clutch for moving it, means defining a pantograph linkage having a pivot fixed on said wringer head and an opposite pivot connected to said shift member, means carried by the frame engaging portions of said pantograph and which when the frame is turned relatively to the head effects distention of said pantograph to move the shift member to open said drive clutch, latch means carried by said wringer head which upon movement of said shift member to open said drive clutch engages the shift member to lock said drive clutch in open position, cam means carried by said disc which when said operating member is turned to neutral position engages said latch means to move it to release said shift member to effect closing of said drive clutch, and means moved by said operating member which when the operating member is in neutral position engages said shift member to hold said drive clutch closed.

5. In a clothes wringer, a wringer head, a frame, means pivotally connecting the frame to the head, wringer rolls journaled in the frame, gearing including a gear shaft and a clutch member in the head to which said rolls are connected, an operating member for moving said clutch member from a neutral open position to a closed position, said operating member having a disc on its inner end, a drive shaft, a drive clutch for connecting the drive shaft to the gear shaft, a shift member connected to the drive clutch for moving it, means defining a pivoted linkage system having bearing points on said wringer head and said shift member respectively, means carried by the frame cooperable with said linkage system and which when the frame is turned relatively to the head effects movement of the shift member to open said drive clutch, retractable and extendable spring latch means carried by said wringer head having an end which normally rests slidably against a side surface of said shift member when retracted and which upon movement of said shift member to open the drive clutch extends to engage said shift member to lock said drive clutch in open position, and cam means carried by said disc which when said operating member is moved to neutral position engages said latch means to retract it to release said shift member to permit it to move to close said drive clutch, such movement of the shift member again bringing one of its side surfaces into contact with said spring latch to hold the spring latch in retracted position.

6. In a clothes wringer of the type having a wringer head and wringer rolls with reversing gearing in the head for driving said rolls including a gear shaft and a gear clutch, wringer roll control means comprising an operating member pivoted in the wringer head for moving the gear clutch from neutral to a gear clutch engaging position, a disc which turns with said operating member, a drive shaft, a drive clutch biased to closed position for connecting the drive shaft to said gear shaft, a shift member for moving said drive clutch to open position, latch means carried by the wringer head which when the shift member is moved to open said drive clutch engages the shift member to lock the drive clutch in open position, cam means carried by said disc which when said operating member is turned from a gear clutch engaging position to neutral position engages said latch means to move it from engagement with said shift member, and a projection on said disc which when said operating member is in neutral position engages said shift member to hold it against drive clutch opening movement.

7. In a clothes wringer having a wringer head, a drive shaft, a wringer gear shaft, a drive clutch biased to closed position for connecting the drive shaft to the wringer gear shaft, a shift member for moving said drive clutch to open position, a spring pressed locking pin in the wringer head which when the shift member is moved to open the drive clutch engages the shift member to lock the drive clutch in open position, clothes wringer driving gears, gear clutch means for connecting the clothes wringer driving gears to said wringer gear shaft, an operating member for said gear clutch means adapted to be moved between a gear clutch opening position and a gear clutch closing position, means actuated by said operating member when moved from said gear clutch closing position to said gear clutch opening position for releasing said locking pin to permit the drive clutch to close, and manually operable means forming a part of the clothes wringer for moving said shift member to open said drive clutch independently of the operation of said gear clutch.

8. In a clothes wringer having a wringer head, a vertical drive shaft having a socket in its upper end, a wringer gear shaft the lower end of which is journaled in said socket, a clutch member slidably splined on the lower end of said gear shaft for connecting the wringer gear shaft to the drive shaft, means biasing said clutch member to closed position, a shift member for moving said clutch member to open position, spring pressed locking means in the wringer head which when the clutch member is moved by said shift member to open position locks it in such position, clothes wringer driving gears, gear clutch means for connecting the clothes wringer driving gears to said wringer gear shaft, an operating member for said gear clutch means adapted to be moved between a gear clutch opening position and a gear clutch closing position, means actuated by said operating member when moved from said gear clutch closing position to said gear clutch opening position for disengaging said locking means from said shift member to permit the drive clutch to close, and manually operable means forming a part of the clothes wringer for moving said shift member to open said drive clutch independently of the operation of said gear clutch means.

References Cited in the file of this patent

UNITED STATES PATENTS

| 1,693,645 | Fahrney | Dec. 4, 1928 |
| 1,746,764 | Carhart | Feb. 11, 1930 |
| 2,091,557 | Montgomery | Aug. 31, 1937 |
| 2,385,769 | Altorfer | Oct. 2, 1945 |